United States Patent [19]

Aleem et al.

[11] Patent Number: 4,598,218
[45] Date of Patent: Jul. 1, 1986

[54] HIGH SPEED ROTOR WITH REMOVABLE CAN

[75] Inventors: Mohd A. Aleem, Roscoe; James L. Lobsinger; Jerry D. Wefel, both of Rockford, all of Ill.

[73] Assignee: Sundstrand Corporation, Rockford, Ill.

[21] Appl. No.: 677,673

[22] Filed: Nov. 30, 1984

Related U.S. Application Data

[62] Division of Ser. No. 523,923, Aug. 17, 1983, Pat. No. 4,510,679.

[51] Int. Cl.$^4$ .............................. H02K 15/00
[52] U.S. Cl. ........................ 310/42; 310/86; 310/270; 29/426.4; 29/598; 83/54
[58] Field of Search ............... 310/42, 211, 85, 86, 310/87, 228, 261, 262, 264, 265, 216, 270, 179; 29/598, 426.4; 83/54, 179, 187

[56] References Cited

U.S. PATENT DOCUMENTS

| | | |
|---|---|---|
| 2,781,465 | 2/1957 | Schuff . |
| 2,967,346 | 1/1961 | McMaster et al. . |
| 2,994,795 | 8/1961 | Cattabiani .................. 310/85 |
| 3,081,411 | 3/1963 | Wiley . |
| 3,138,105 | 6/1964 | White ...................... 310/86 |
| 3,153,162 | 10/1964 | Anthony et al. . |
| 3,990,802 | 11/1976 | Corona . |
| 4,204,314 | 5/1980 | Workman . |
| 4,432,411 | 2/1984 | Hooper .................. 310/261 |

Primary Examiner—R. Skudy
Attorney, Agent, or Firm—Wood, Dalton, Phillips, Mason & Rowe

[57] ABSTRACT

According to the invention, a rotor is provided having a cylindrical core and a protective can closely fit and secured with the core. The core is provided with two axially spaced, annular reliefs spaced inwardly from points of welding which secure the can and core and connected by at least two circumferentially spaced, axial reliefs. To effect removal of the can, a cutting tool is extended through the can along the extent of the reliefs. With the cuts completed, access sections are defined and are separable from the core. The remainder of the can, including the weld material, can be machined off using conventional techniques.

5 Claims, 5 Drawing Figures

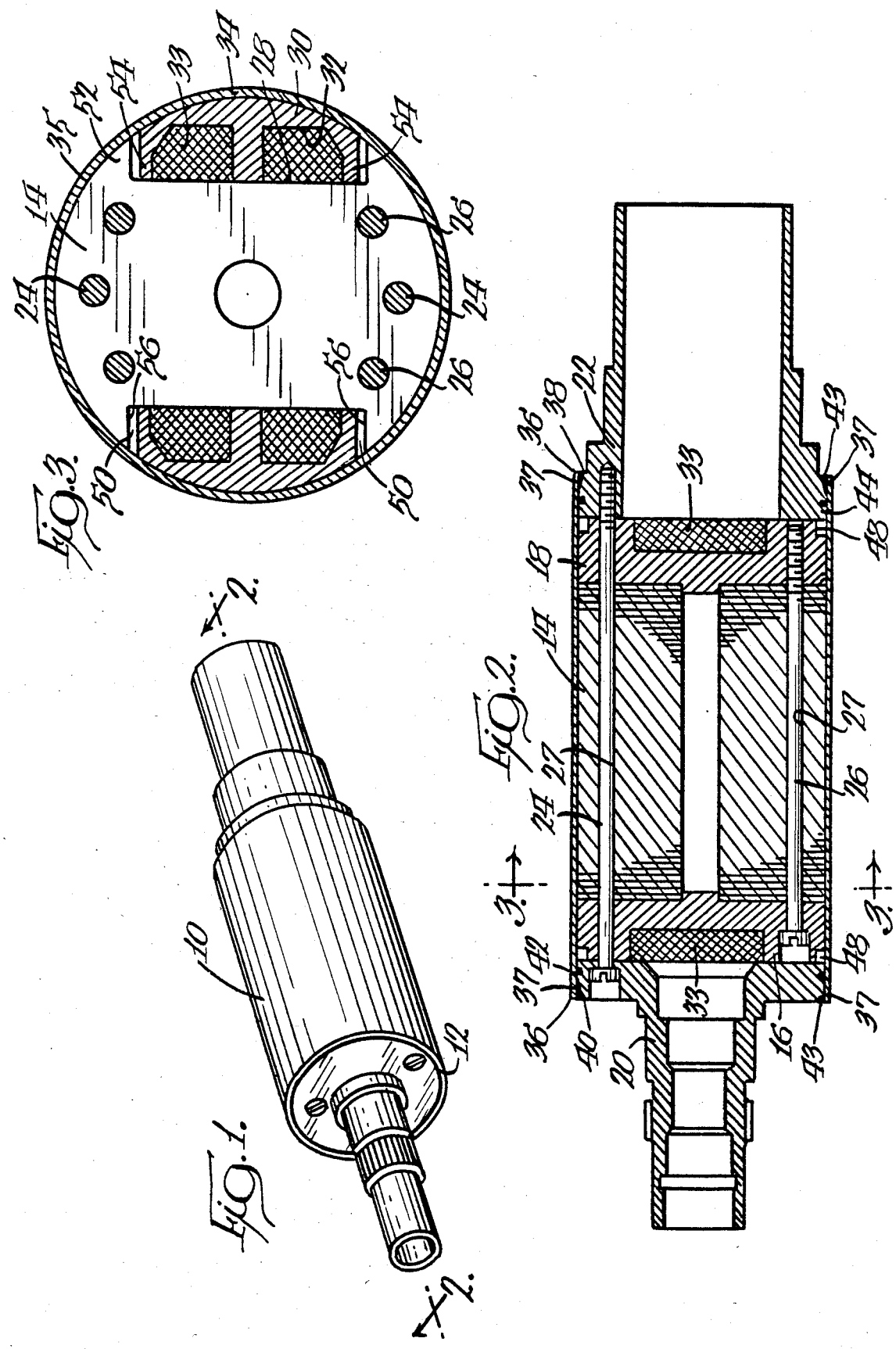

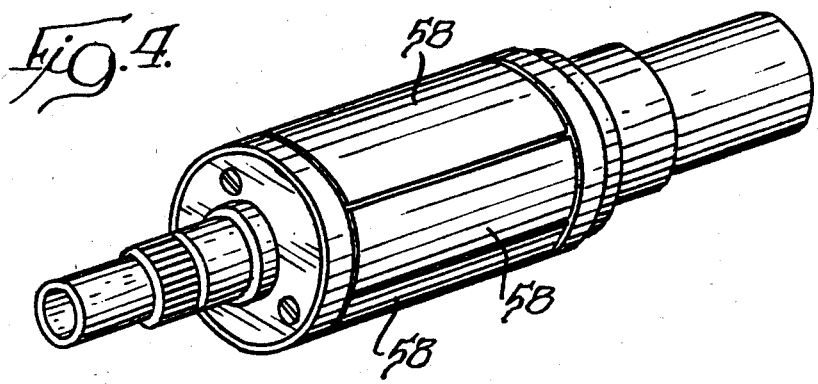
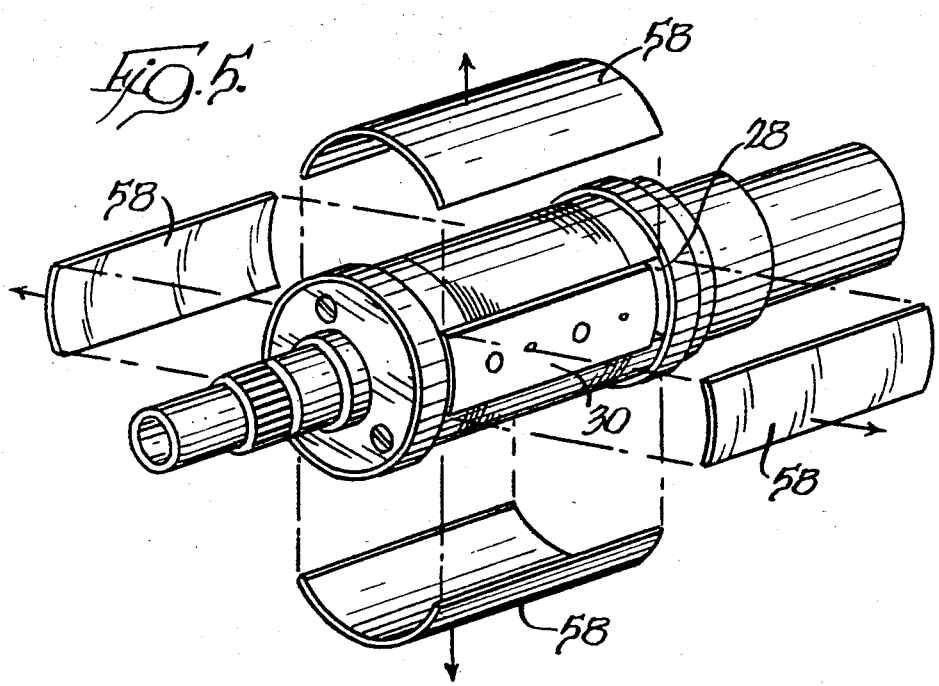

HIGH SPEED ROTOR WITH REMOVABLE CAN

This is a division of application Ser. No. 523,923, filed Aug. 17, 1983, now U.S. Pat. No. 4,510,679.

DESCRIPTION

Technical Field

This invention relates to rotors for use in electrical generators and more particularly to a method of removing the rotor encasement for refurbishment of the rotor.

BACKGROUND ART

To enhance the structural integrity of a rotor and provide a structure suitable for high speed operation, the rotor core assembly is generally encased by a rigid, protective can. The can, which conforms to the peripheral surface of the core, is generally interference fit with the core and joined as by welding.

The principal drawback with this particular construction is that the can becomes a permanent part of the rotor assembly and cannot be removed without damaging other parts of the rotor. Any minor defect in any portion of the rotor contained by the can renders the entire structure unusable. Rotor refurbishment is thus precluded and potentially reusable components of the rotor may be disposed of before their useful life is completed.

The present invention is directed to overcoming the above problem.

DESCRIPTION OF THE INVENTION

The present invention resides in the provision of annular and/or axial reliefs in the core of a rotor typically having an overall cylindrical configuration. A cylindrical can is disposed over the core and overlies the reliefs and is welded or otherwise suitably affixed to the core.

Removal of the can is accomplished by cutting the can along the reliefs with the reliefs permitting extension of a cutting edge entirely through the can without contacting the core. A removable section is thus defined in the can, permitting access to the core. The remainder of the can is removable by a conventional machining operation.

In a highly preferred form, axially spaced, annular reliefs are provided in the rotor assembly and are joined by at least two axially extending reliefs. The can is cut along the extent of the reliefs to define at least two readily separable access sections.

By facilitating removal of the can from the core assembly, reworking of the rotor elements is made possible and the useful life of the rotor thereby prolonged. Further, neither the structural integrity nor the effectiveness of the rotor are compromised.

BRIEF DESCRIPTION OF THE DRAWINGS

FIG. 1 is a perspective view of a rotor incorporating a cylindrical protective can and embodying the invention;

FIG. 2 is a sectional view of the rotor taken along line 2—2 of FIG. 1 and illustrating spaced annular reliefs according to the invention;

FIG. 3 is a sectional view of the rotor taken along line 3—3 of FIG. 2 and illustrating axial reliefs according to the invention;

FIG. 4 is a perspective view of the rotor in FIG. 1 with the can cut along the axial and annular reliefs;

FIG. 5 is an exploded perspective view of the rotor in FIG. 4 with the can separated from the rotor core.

BEST MODE FOR CARRYING OUT THE INVENTION

An assembled rotor 10 incorporating a cylindrical can 12 is illustrated in FIG. 1 and is exemplary of a structure with which the invention is operable. The basic rotor structure is shown clearly in FIG. 2 and comprises generally a main core 14, core winding end turn supports 16, 18 mounted at the axial ends of the core 14 and end shaft fittings 20, 22 mounted in turn to the end supports. The core subassembly, to include the core 14, end supports 16, 18 and end shaft fittings 20, 22 is held together by axially extending long and short bolts, respectively 24 and 26.

The arrangement of elements illustrated facilitates sequential buildup from the core 14. The short bolts 26 extend from opposite ends of the end supports, threadably into the core 14. Each short bolt 26 extends through its respective end support 16, 18, entirely through the core 14 and into the opposite end support 16, 18 so as to prevent relative rotational movement between the end turn supports and the core. With the end supports and core united, the end shaft fittings 20, 22 are mated with the ends of the end supports 16, 18. At least two long bolts 24 extend axially and oppositely with each bolt 24 extending through its respective end shaft fitting 20, 22, the adjacent end turn support 16, 18, through the core 14 and through the spaced end turn support and into the opposite end shaft fitting.

The bolts 24, 26 and receiving bores 27 are machined to close tolerances. The bolts are precision ground, high strength, high permeability bolts which become part of the final assembly. As a result, the air gaps are minimal as is the disruption of the magnetic field from the connecting bolts.

To accommodate field windings, oppositely opening recesses 28 (FIGS. 3 and 5) are provided within each of which an axially extending M-shaped wedge 30 is inserted. The wedge at each side of the core 14 defines, in conjunction with the core 14, spaced passageways 32 which accommodate the field windings 33. The outer surface 34 of the wedge 30 is contoured to define with the peripheral surface 35 of the core 14 a substantially cylindrical shape. The core and wedges may be machined after assembly to achieve the desired tolerances.

After completion of the core subassembly, the can 12 is assembled. The can 12 has an axial extent sufficient to overlap a portion of each end shaft fitting 20, 22. The can has radially spaced inner and outer surfaces (not identified in the drawings), with the inner surface disposed closely over the outer surface of the core assembly. Preferably, the free edges 36 of the can 12 will mate flushly at one end with a shoulder 38 defined by a stepped arrangement on the one end shaft fitting 22 and an oppositely and axially facing edge 40 formed by an annular ring 42 integral with the end shaft fitting 20 and coaxially aligned with the rotational axis of the rotor. The can is welded as at 37 adjacent its edges 36 with the annular ring 42 and the outer rim 44 defining the shoulder 38 to fix the can 12. To assure a precision weld, an annular weld relief 43 is formed in the ring 42 and rim 44.

The invention resides in part in the provision of an annular relief 48 in each of the end turn supports 16, 18 about the entire periphery thereof. The cross-section of each relief, as seen in FIG. 2, is preferably square or rectangular but may take any other desired configuration and may vary depending on the particular cutting tool contemplated.

To complement the annular reliefs 48, longitudinally extending reliefs 50 are defined between the wedges 30 and the core 14 as seen most clearly in FIGS. 3–5 and extend uninterrupted between the end shaft fittings 20, 22. The core 14 takes a substantially I shape with the cross bars 52 of the I defined by the oppositely opening recesses 28. The spacing between the outer legs 54 of each wedge 30 is slightly less than the distance between the flat surfaces 56 under each cross bar 52. The reliefs 50 are defined by the gap between the legs 54 and the cross bars 52. Preferably, each wedge 30 is contoured to be centered in its respective recess 28 so that two separate reliefs 50 are defined by each wedge for the reasons advanced below. The wedges 30 are joined with the core 14 in conventional manner.

Removal of the can 12 from the rotor subassembly is accomplished by cutting completely through the can along the extent of the annular and axial reliefs. The edge of the cutting tool, which is conventional, pierces the can and extends into the reliefs. The cutting edge will not contact any of the wedge, core or end turn supports. The preferred pattern of cuts is shown clearly in FIG. 4. Once this is accomplished, a plurality of access sections 58 are formed. The access sections all extend through an arc less than 180° so that the sections are readily separable from the core subassembly without having to deform the same. The location of the annular cuts is chosen to be spaced axially inwardly toward the center of the core from the point of welds 37 so that the welds 37 will not inhibit removal of any of the sections 58. With the section 58 removed, disassembly of the core subassembly may take place and all components, other than the end shaft fittings 20, 22 are ready for replacement or re-use, as the case may be.

To enable reuse of the end shaft fittings 20, 22, the remaining can fragments and weld material is removed from the end shaft fittings by machining. Because the end shaft fittings are cylindrical and coaxially aligned with the rotational axis of the rotor, machining of the weld material can be easily accomplished. With the can removed, refurbishment or repair of the rotor can proceed. After reworking, a new can may be reattached to the core subassembly.

We claim:

1. In a rotor of the type having a core subassembly having opposed ends, an outer peripheral surface and a rotational axis and a cylindrical can having inner and outer surfaces, said inner surface disposed closely over and fixed to the outer surface of the core subassembly, the improvement comprising:
   a plurality of annular reliefs in the outer peripheral surface of the core subassembly; and
   a plurality of axially extending reliefs in the outer surface of the core subassembly and each intersecting both of the annular reliefs,
   said reliefs permitting cutting of the can completely through the can over the reliefs without damaging the core subassembly;
   whereby with the can cut over the reliefs said can can be separated from the core subassembly to expose the core subassembly for refurbishment thereof.

2. The improved rotor of claim 1 wherein said core subassembly comprises a core and an end turn support at each axial end of the core and said annular reliefs provided in the end turn supports.

3. The improved rotor of claim 1 wherein said core has an axial recess with a longitudinally extending wall and a wedge is provided in the recess to accommodate field windings, said wedge in conjunction with the wall defining the axially extending reliefs.

4. The improved rotor of claim 2 wherein an end shaft fitting is attached to the end turn support and means connect the can to the end shaft fitting.

5. In a rotor of the type having a core subassembly having opposed ends, an outer peripheral surface over which a cylindrical can can be closely fit and a rotational axis, the improvement comprising:
   at least one relief in the outer surface of the core subassembly defining a cutting path,
   said cutting path configured so that with the can cut completely therethrough along the path, at least a portion of the can can be separated from the core subassembly without deforming the can portion;
   said relief permitting cutting of the can completely therethrough over the at least one relief without damaging the core subassembly.

* * * * *